United States Patent
Ruebner et al.

(10) Patent No.: US 6,527,887 B1
(45) Date of Patent: Mar. 4, 2003

(54) POLYMERIC CYCLODEXTRIN NITRATE ESTERS

(75) Inventors: Anja Ruebner, Munich (DE); Gary L. Statton, West Chester, PA (US); John P. Consaga, Bolton Landing, NY (US)

(73) Assignee: Mach I, Inc., King of Prussia, PA (US)

( * ) Notice: Subject to any disclaimer, the term of this patent is extended or adjusted under 35 U.S.C. 154(b) by 0 days.

(21) Appl. No.: 10/052,430

(22) Filed: Jan. 18, 2002

(51) Int. Cl.[7] .......................... C06B 25/02; C08G 63/91
(52) U.S. Cl. ..................... 149/108; 525/54.2; 525/54.3; 525/54.42; 525/63; 525/66; 524/81; 149/88; 149/108.6; 149/108.8; 149/109.6
(58) Field of Search .................. 525/54.2, 54.3, 525/54.42, 63, 66; 524/81; 149/88, 108, 108.6, 108.8, 109.6

(56) References Cited

U.S. PATENT DOCUMENTS

| | | |
|---|---|---|
| 4,274,985 A | 6/1981 | Szejtli et al. |
| 5,114,506 A | 5/1992 | Consaga et al. |
| 5,360,899 A | 11/1994 | Nussstein et al. |
| 5,608,015 A | 3/1997 | Yoshinaga |
| 5,728,823 A | 3/1998 | Reuseher et al. |
| 5,760,017 A | 6/1998 | Djedaini-Pilard |
| 5,792,821 A | 8/1998 | Bowen |
| 5,821,349 A | 10/1998 | Djedaini-Pilard |
| 5,831,081 A | 11/1998 | Reuseher |
| 5,846,954 A | 12/1998 | Joullie et al. |
| 5,910,551 A | 6/1999 | Bowen |
| 5,929,131 A | 7/1999 | Bowen |
| 5,942,501 A | 8/1999 | Hayward et al. |

*Primary Examiner*—Samuel A. Acquah
(74) *Attorney, Agent, or Firm*—William C. Long

(57) ABSTRACT

Cyclodextrin polymers are nitrated to provide novel nitrate esters of cyclodextrin polymers which are useful for encapsulating explosives to provides energetic compositions of reduced sensitivity; a new method for the preparation of cyclodextrin polymers is provided.

14 Claims, 5 Drawing Sheets

LINEAR TUBE OF CYCLODEXTRINS (CD). R = -ONO, or H n=5, for alpha CD
n=6, for beta-CD
n=7, for gamma-CD

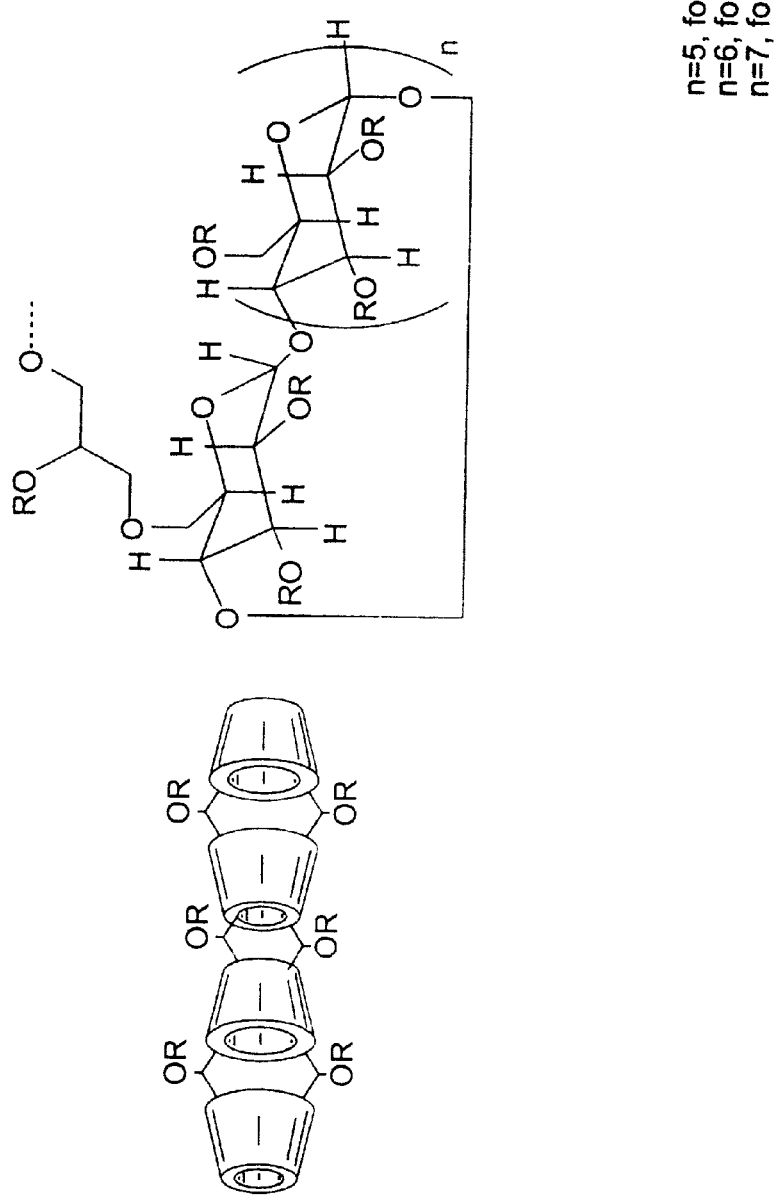
FIG. 1    LINEAR TUBE OF CYCLODEXTRINS (CD). R = -ONO, or H

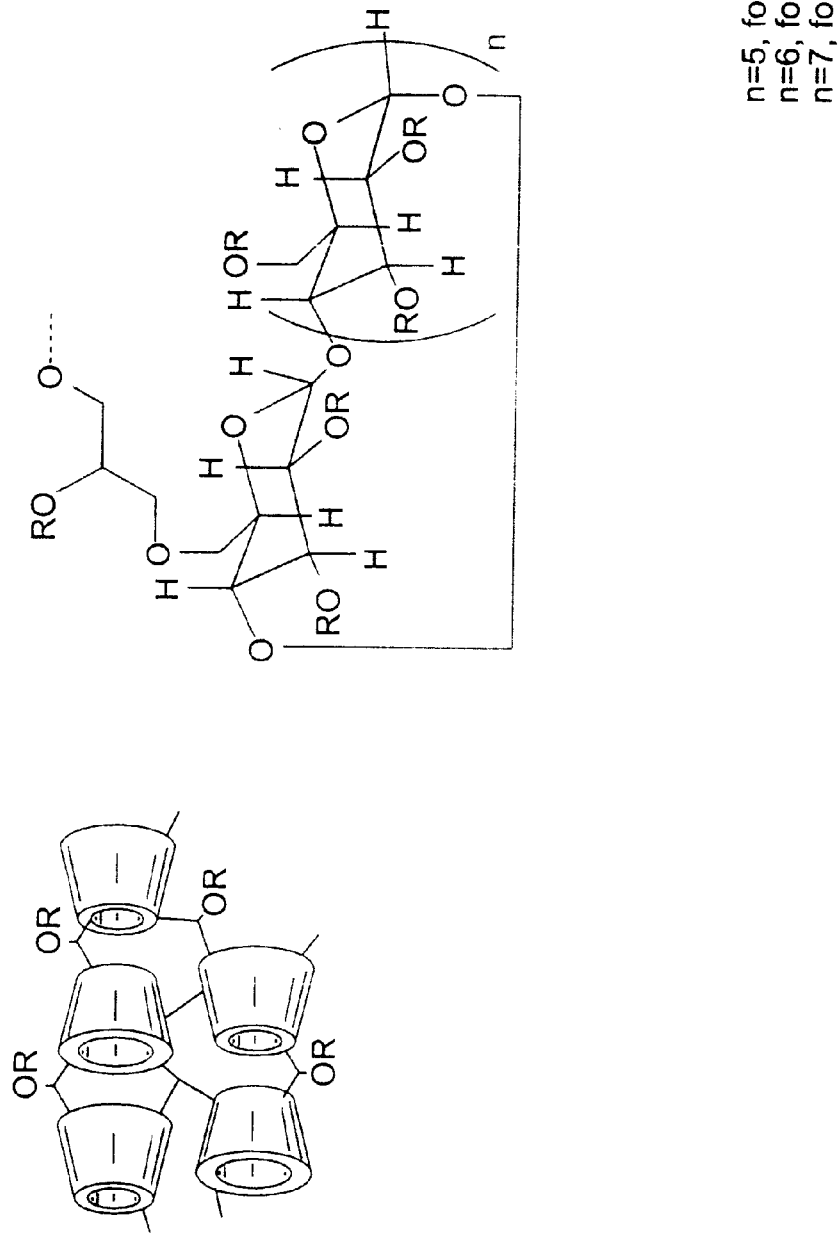
FIG. 2  CD CROSSLINKED BY HYDROXYPROPYL LINKS. R = -ONO₂ or H

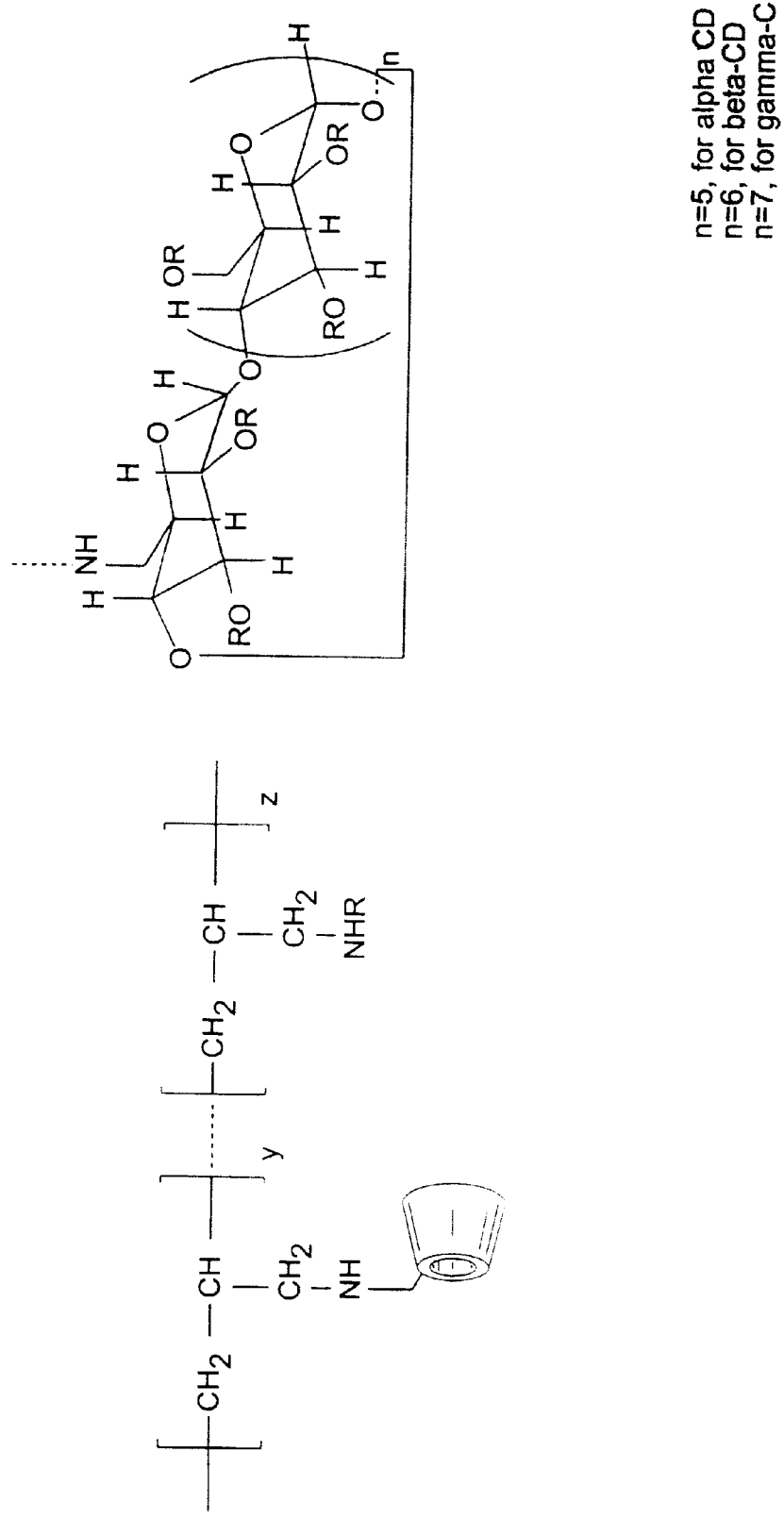
FIG. 3   LINEAR POLYMER WITH PENDANT CD'S.  R = -ONO, or H

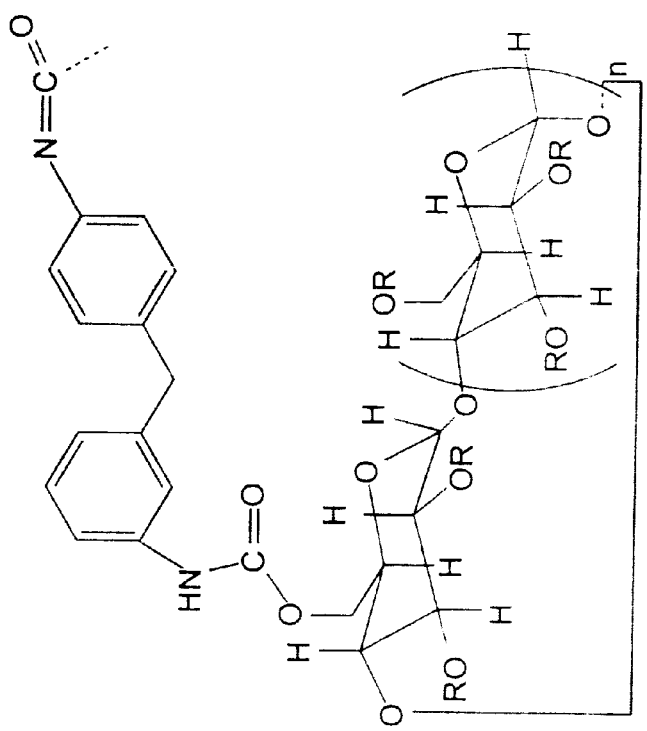
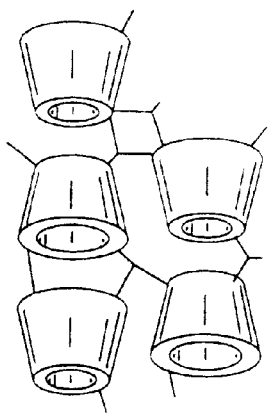
FIG. 4  CD CONNECTED BY URETHANE LINKAGES. R = -ONO, OR H
n=5, for alpha CD
n=6, for beta-CD
n=7, for gamma-CD

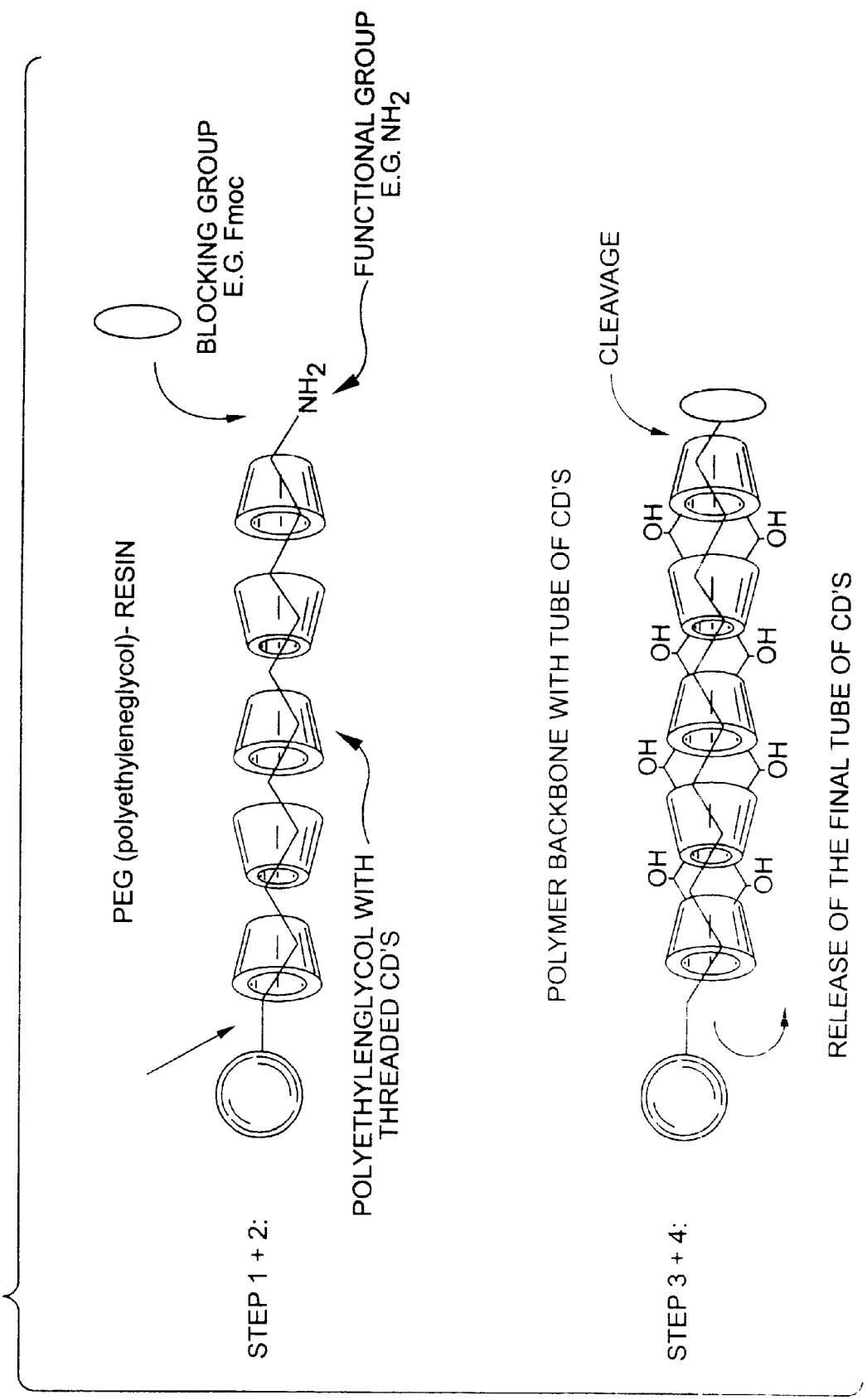
FIG. 5 SYNTHESIS OF A LINEAR TUBE OF CYCLODEXTRINS ON A PEG POLYSTYRENE BASED RESIN

POLYMERIC CYCLODEXTRIN NITRATE ESTERS

FEDERAL SPONSORSHIP

This invention was made with United States Government support under Eglin AEF Contract F08630-98-C-0015, Mar. 23, 1998. The United States Government has certain rights to the invention.

BACKGROUND OF THE INVENTION

1. Field of the Invention

The present invention relates to nitrate esters of ten cyclodextrin polymers and the encapsulation of explosives therein to obtain energetic materials with high energy performance but with reduced sensitivity characteristics.

2. Description of the Prior Art

Throughout this application, various publications are referenced in parentheses by author and year. The disclosure of these publications in their entireties are hereby incorporated by reference to more fully describe the state of the art to which this invention pertains.

The military and aerospace community has an on-going interest in and need for energetic materials with high energy performance but with low sensitivity characteristics. It is advantageous to find energetic materials or composites which can be used to produce new propellants and explosives that are less sensitive to detonation due to shock, fire or fragment impact while providing the same or greater energy than similar nitrocellulose based gun propellants and explosives. A desensitization of explosives is described in U.S. Pat. No. 5,114,506 using nitrate esters of cyclodextrins and an energetic organic nitrate ester plasticizer. The desensitization arises from the ability of cyclodextrins to encapsulate explosives.

An improvement of this strategy is presented according to the present invention which contains the first disclosure of nitrate esters of cyclodextrin polymers. These nitrate esters of various cyclodextrin polymers provide high molecular weight materials having improved behavior in explosive formulations, leading to favorable processing properties. The synthesis of the starting materials (cyclodextrin polymers) are in part taught in the literature. In accordance with the invention, such polymers can be converted to energetics by nitration. Polymeric cyclodextrin nitrate esters can be used as possible components of shock-insensitive, high-performance energetics. These materials are also suitable as components of insensitive, minimum smoke-producing propellants.

BRIEF DESCRIPTION OF THE INVENTION

In accordance with the present invention, cyclodextrin polymers are nitrated in order to produce novel cyclodextrin polymer nitrate esters. A further feature of the invention is the encapsulation of explosive materials in the cyclodextrin polymer nitrate esters with the resulting formation of highly energetic materials having relatively shock-insensitive characteristics.

As a further feature, the invention provides a new method to synthesize a linear tube of cyclodextrin molecules, by using a water swellable, polystyrene based resin for complex formation as a first step in the synthetic process.

BRIEF DESCRIPTION OF THE DRAWINGS

FIG. 1 illustrates a nitrate ester of a linear tube of connected cyclodextrins.

FIG. 2 illustrates a nitrate ester of a crosslinked water soluble cyclodextrin polymer.

FIG. 3 illustrates a nitrate ester of a linear polymer with pendant cyclodextrin.

FIG. 4 illustrates a nitrate ester of a crosslinked water insoluble cyclodextrin polymer.

FIG. 5 illustrates the novel synthesis of a linear tube of cyclodextrins.

DETAILED DESCRIPTION OF THE INVENTION

The present invention relates to novel compositions of matter comprising nitrate esters of various cyclodextrin polymers. As is well known, cyclodextrins are cyclic molecules consisting of D-glucose units and the molecules are constructed so that hydroxyl groups lie along the rims which are therefore hydrophilic while the interior is relatively non-polar and lipophilic. The lipophilic cavity entraps or encapsulates a wide variety of other chemical compounds without the formation of covalent bonds. Inclusion of the guest molecule in the cavity can give rise to some beneficial modifications of the guest not otherwise available. As is known, the cyclodextrin units can be connected by reaction with a crosslinking reagent, which is able to react with the primary or secondary hydroxyls of the cyclodextrin. The final linker will look like —O—X—(A)—Y—O—, wherein the oxygen comes from the hydroxyl of the cyclodextrin, X and Y can independently be a —CH group, a chain of —$CH_2$'s or an aromatic group. A can be —H, —OH, —$NH_2$, or —COOH. The polymer can also bear one-side reacted linkers as substituents due to an incomplete crosslinking reaction.

After crosslinking of the cyclodextrin to a polymer at least an two hydroxyl groups of one cyclodextrin unit are reacted to accomplish the linkages. In case of an hydroxy-propyl linked embodiment (FIGS. 1 and 2) one new hydroxyl group is gained from the linker. Preferably an average of 2–3 hydroxyl groups of each D-glucose unit or within the linker are converted to nitrate esters under the condition of nitration to be later described.

In another embodiment the cyclodextrins are connected by urethane linkages (FIG. 4). Only the hydroxyls of the cyclodextrin units are available for conversion to nitrate ester groups in this embodiment.

In still another embodiment a linear polymer is used and cyclodextrins are bound to the polymer backbone by a secondary amine, urethane, ester or ether linkage (FIG. 3). The monomer units of the polymer backbone have the formula —$X_n[X—Z(Xn—Y)_m]_p$—, wherein X is —$CH_2$, Z is —CH—, Y can be —$NH_2$, —COOH, or —OH, n is 0–1 m is 1 and P is 20–200. The molecular weight of the polymer can be between 1,000 and 100,000. The cyclodextrin units are connected to the polymer backbone establishing a bond with Y. When Y is an amine or a hydroxyl and is not consumed by a linkage to a cyclodextrin, it is available for nitration as well. If Y is a hydroxyl, a functionalized cyclodextrin derivative has to be used to achieve the binding reaction. Functionalization reactions of cyclodextrins are well-known in the art. In a preferred embodiment a carboxymethyl cyclodextrin derivative is used.

A new method for synthesis of linear tubes consisting of alpha, beta and gamma cyclodextrins is included in the present invention. The synthesis of linear tubes consisting of alpha cyclodextrins is already known and patented (Harada et al., Japan patent 7048451 A (1995)). Our invention provides a new and improved method for synthesis of tubes of cyclodextrins, which is more versatile allowing the synthesis of tubes other than alpha cyclodextrins and provides higher yields.

In this new method, a water swellable, polystyrene based resin is used. These resins mainly used in solid phase organic synthesis are the water swellable, polystyrene based resin consisting of poly-ethyleneglycol (PEG) or polypropyleneglycol (PPG), which is grafted to an insoluble polystyrene backbone. A variety of these PEG—and PPG—resins are commercially available, with different functional groups at the end of the PEG or PPG chain. By adding cyclodextrin to the resin, a complex formation on this resin can be achieved where the cyclodextrin is threaded on to the PEG or PPG polymer chain (FIG. 5 step 1 and 2). By reacting a blocking group e.g. 9-fluorenylmethyloxycarbonyl (FMOC) sufficient in size, with the functional group of the function group of the PEG or PPG polymer chain, de-threading of cyclodextrins can be avoided. This construct of threaded and blocked cyclodextrins is called a polyrotaxane. After being permanently blocked on the resin two adjacent cyclodextrin units can be linked together by a bi-functional linker. The final linker will look like —O—X—(A)—Y—O—, wherein the oxygen comes from the hydroxyl of the cyclodextrin, X and Y can Independently from each other be a single —CH group, a chain of —CH$_2$ or an aromatic group. A can be —H, —OH, —NH$_2$, or —COOH. The polymer can also bear one-side reacted linkers as substituents. 2–100 cyclodextrin units can be linked together in this way depending on the molecular weight of the PEG part grafted to the resin. The last step is the chemical removal of the blocking group and the release of the tube of cyclodextrins. The deblocking is achieved by methods well-known for the respective blocking group. A release of the tube is achieved by using organic solvents which have a higher affinity to the cyclodextrin cavity compared to the PEG.

Each D-glucose unit has three hydroxyl groups (—OH), if none of these was consumed for a crosslinking reaction, each is capable of being nitrated to a nitrate ester group (—ONO). Preferred starting materials for the invention are alpha-cyclodextrin which consists of six D-glucose units, beta-cyclodextrin which consists of seven D-glucose units, and gamma-cyclodextrin which consists of eight D-glucose units.

The poly-cyclodextrins can be nitrated using conventional techniques that are used in the preparation of nitrocellulose. The degree of nitration can be controlled by varying the nitration conditions. From 70 to 90 percent nitric acid (HNO$_3$) may be used, 90 percent HNO, is preferred to achieve greater nitration. The nitration may also be accomplished by using 90% HNO, and sulfuric acid (H$_2$SO$_4$) or 90%. HNO$_3$ and oleum. In each of these methods care is taken to keep the reaction temperature below 30° C. during the IBM nitration. Other methods that should work as well include (1) It nitric acid and phosphoric acid, (2) nitric and acetic-anhydride, (3) sodium nitrite and sulfuric acid, and (4) non-acidic conditions using nitronium tetrafluoroborate.

Experimental Details

The following experimental details are set forth to aid in an understanding of the invention and are not intended, to limit in any way the invention set forth in the claims follow thereafter.

A new method to synthesize linear tubes consisting of alpha, beta and gamma cyclodextrins is disclosed. One example for this new synthetic method is shown in FIG. 5 and described in Example 1. The nitration of linear tubes of alpha, beta and gamma cyclodextrins is disclosed. A preferred embodiment is illustrated in FIG. 1.

The non-nitrated derivatives of the cyclodextrin polymers shown in FIGS. 1–3 are known in the art. (Seo et al., 1987), (Harada et al., 1991), (M. Ceccato et al., 1997). The average number of cyclodextrin units can be 2–100 for the cyclodextrin polymer shown in FIGS. 1, 3 and 4, 2–50 for cyclodextrin polymer in FIG. 2.

The composition of matter of the invention comprises nitrated cyclodextrin polymers (FIG. 1–4) with molecular weights between 2,000–50,000 and with a nitration degree corresponding to 10–20% nitrogen.

The following examples illustrate the invention:

EXAMPLE 1

Synthesis and Nitration of Linear Tubes of Cyclodextrin 5 g. of alpha cyclodextrin are dissolved in 100 ml water. 1 g. PEG polystyrene based resin e.g. Novasyn (Novabiochem) is added and the mixture is stirred for 2 weeks. The resulting loaded resin is filtered and dried. A 20-fold excess of N-9-Fluorenylmethyloxycarbonyl-succinimide (Fmoc-Succinimide) is dissolved in 5 ml DMF, the dried loaded resin is added and the mixture is stirred for 5 hours at 50 degree centigrade. The resin is filtered and carefully washed with DMF, EtOH and water. The loaded, blocked resin is re-suspended in 10N NaOH and a 100-fold excess epichlorohydrin is added. The mixture is stirred for 3 hours at 50 degree centigrade. After filtration and careful washing the loaded, blocked and crosslinked resin is filtered and re-suspended in a mixture of 10 ml. DMF and 1 ml. diethylamine The final tube of cyclodextrin is precipitated in acetone. Gel permeation HPLC indicated a molecular weight between 15,000–20,000. The cyclodextrin content was determined by a UV spectroscopic method using phenol and sulfuric acid. The cyclodextrin content is 65%.

H NMR (D$_2$O):=5.5–5.2 (d(broad); H–1); 4.4–3.3, (2m; CD protons). IR (KBr): 3413 (s; OH), 2904 (s; C—H), 1102, 1041 cm$^-$m,(C—O).

Nitration 1 g of the polymer (linear tube of cyclodextrins) is then dissolved in 10 ml nitric acid (98%) at 10° C. The mixture is stirred for 30 min and then precipitated over ice. The product is filtered and washed, dissolved in acetone and re-precipitated in water again. The product is filtered and dried in vacuum. Elemental analysis of the novel nitrated product showed a nitrogen level of 9.55%.

IR (KBr) 2926 (s; C—H), 1629 (s; N=O),1508 (w; C—H). 1282 (m; N=O), 1102, 1041 cm$^{-1}$m(C—O).

EXAMPLE 2

Synthesis and Nitration of a Cyclodextrin Polymer Crosslinked by Hydroxypropyl Links (FIG. 2)

287 g (7.2 Mol) of NaOH are dissolved in 1250 ml water. 500 g (0.38 Mol) cyclodextrin and 1 g NaBH$_4$ are added. The solution s is warmed to 50° C. and 350 ml (4.5 Mol) epichlorohydrin are slowly dropped into the solution and the mixture is stirred for 3 hours. After cooling to 4° C. 125 ml acetone are added and the mixture is stirred for 1 hour. The acetone layer is removed by separation and the solution is stirred for another 3 hours at 50° C. After neutralization with 10 N HCl the crude reaction mixture is purified by tangential flow membrane filtration (Centramate™, Pall filtron, cut-off filter 3,000). After freeze drying of the purified solution the pure product is obtained (75% yield). The average molecular weight is determined by Vapor Pressure Osmometry (Mn=4185). A cyclodextrin content of 59% is determined with phenol-sulfuric acid.

HPLC: 4.79 min. for the main peak 5.53 min. for the shoulder Column: Jordi Gel DVB 1000A, mobile phase:. DMSO, flow rate: 1 ml/min. Detector: refractive index.

H NMR (DMSO-$d^6$)=5.2–4.4 (m; CD protons); 1.2 (d; $CH_2$ linker); 1.1–1.0 (m; $CH_2$ linker); 0.9 ppm (d; $CH_2$ linker). C NMR ($D_2O$):=100 (C-1); 80 (C-4); 76 (C-2, C-3); 72 (C-5); 71 (linker); 70 (linker); 60 ppm (C-6).

Nitration 100 g of the cyclodextrin polymer are dissolved in 1000 ml nitric acid (98%) at 10° C. The mixture is stirred for 30 min and then precipitated over ice. The product is filtered and washed, dissolved in acetone and re-precipitated in water. After filtration the material is dried in vacuum. The molecular weight is determined by GPC, which showed a doubling in molecular weight, indicating almost complete nitration of all available hydroxyl groups. Elemental analysis showed a nitrogen level of 11.6%.

IR (KBr) 2926 (s; C—H), 1629 (s; N=O), 1510 (w; C—H). 1282 (m; N=O), 1102, 1041 $cm^{-1}$ (C—O).

EXAMPLE 3

Synthesis and Nitration of a Linear Polymer with Pendant Cyclodextrins (FIG. 3)

10 g (7.71 mMol) gamma cyclodextrin are dissolved in 80 ml pyridine. 1.3 g p-Toluenesulfonylchloride (6.94 mMol) are dissolved in 40 ml pyridine and dropped into the cyclodextrin solution. The solution is stirred for 2 hours at room temperature. After evaporation of the solution to a low volume the residue is precipitated in 500 ml acetone. The precipitate is filtrated and dried in vacuum. The crude product contains unsubstituted gamma cyclodextrin and mono-6-tolysulfonyl-6-deoxy-2-cyclodextrin in a ratio 2:1.

FAB-MS 1298, 1452 (M+H) IR (KBr): 3413 (s; OH), 2927 (s; C—H), 1600, 1505 (s; C=C), 1490 (m; C—H), 1323 (m; O—H) and 1158 m, 1181 m, 1030 $cm^{-1}$ m (C—O). H' NMR (DMSO-$d^6$):–7.7–7.4 (AA'BB'; 4H; Ar—H); 5,74 (m; 16H, sec. OH); 4.78–4.79 (m; 8H,H-1); 4.50 (m; 8H, prim. OH), 3.59–3.2, (2m; CD protons), 2.38 ppm (s; 3H, Ar—$CH_3$).

Binding to Polyallylamine 2 g (35 m mol) KOH are dissolved in 100 ml methanol. 48 g (0.2 m mol) of the HCl salt of polyallylamine (MW 15,000) are added to the caustic solution. The mixture is stirred overnight. KCl is filtered off and the remaining solution is evaporated to a low volume.

6 g crude 6-tolylsulfonyl-6-deoxy-2-cyclodextrin (1.68 mMol related to the pure mono-substituted derivative as estimated from TLC) are dissolved in methanol/DMF (2:1, v/v) and reacted with polyallylamine (0.32 mMol) in methanol/DMF (2:1, v/v) at 50° C. for 5 hours. The product precipitates during the reaction and is collected by centrifugation. The solid is dissolved in water and purified by membrane filtration until no unreacted cyclodextrin can be detected. The retentate is freeze dried and 3.8 g (83.0% yield based on polyallylamine) pure product are obtained as a white powder.

IR (KBr): 3413 (s; OH), 2927 (s; C—H), 1567 (s; N—H), 1490 (m; C—H), 1323 (m; O—H) and 1158 m, 1181 m, 1030 $cm^-m$ (C—O, CD). H'-NMR ($D_2O$): 4.99 (s; H—1, CD); 3.75–3.55 (2m; CD protons), 2.9–2.6 ($s_2$ with shoulder; 5 H, $CH_2$, PAA) and 1.56–1.18 ppm (2s; 89H, CH—$CH_2$, PAA).

The amount of bound cyclodextrin is determined by comparing the H'-NMR integrals of H-1 and $CH_2$ (2.6 ppm) of PAA and yielded 58.2 wt %. Quantitative sugar determination with anthrone yielded a CD content of 54%. Elemental analysis: N/C ratio: 0.199.

Nitration 1 g of the above polymer is dissolved in diluted nitric acid to form the nitrate salt. 10 ml nitric acid (98%) are added at 10° C. The mixture is stirred for 30 min and then precipitated over ice. The product is filtered and washed, dissolved in acetone and re-precipitated in water. After filtration the novel polymer material is dried in vacuum. Elemental analysis showed a nitrogen level of 19.87% HPLC: 6.6 min. Column: Jordi Gel DVB 1000A, mobil phase: DMSO, flow rate: 1 ml/min, detector: refractive index.

EXAMPLE 4

Synthesis and Nitration of a Cyclodextrin Polymer, which is Connected by Urethane Linkages (FIG. 4)

20 g dried cyclodextrin are dissolved in 200 ml anhydrous DMSO. The solution is heated to 100 degrees centigrade. 0.8 mol equiv. 4,4' methylenebis(phenyl isocyanate) (MDI) dissolved in 20 ml anhydrous DMSO are added drop wise. The solution is stirred for 8 hours at 100 degree centigrade. After cooling to ambient temperature the mixture is precipitated in methanol. The product is filtered, washed with water and dried in vacuum. The molecular weight is approx. 2,000. The cyclodextrin content is 81%. HPLC: 6.16 min. Column: Jordi Gel DVB 1000A, mobil phase: DMSO, flow rate: 1 ml/min. detector: refractive index.

IR (KBr): 3410 (s;OH), 2990. 2906 (s: C—H), 1661 (w; aromatic C=C), 1435, 1406 (m, C—H), 1309 (m, O—H) and 1154 m, 1019 (m) $cm^{-1}$. 948 (s; aromatic C—H). H NMR (DMSO-$d^6$)=7.5–7.1 (AA'BB'; Ar—H); 5.79 (m; sec. OH), 4.9 (s;H-1); 4.59 (m;prim. OH), 3.59–3.2 (2m;CD protons).

Nitration in liquid $CO_2$ with $N_2O_5$ 1 g of the above polymer and 5 g sodium fluoride are added to a 600 ml vessel. A nitric acid/dinitrogen pentoxide mixture is added to a 60 ml vessel. The agitator is turned on and carbon a dioxide is slowly added to both vessels until the pressure is 61 atm (1900 psi). The −25° C. cooling fluid is pumped through the jackets of both vessels. The 600 ml vessel carbon dioxide addition tube is closed and the valve between the two vessels is opened. For 90 min 1.4 g of carbon dioxide/min is passed through the two vessels. The temperature is −10±2° C. The pressure is slowly released and the product is poured into 20 g of sodium bicarbonate in one liter of water. The pressure vessel was rinsed with 700 ml of additional water. The mixture is filtered and the nitrated polymer is washed twice with water. Yield: 0.6 g of a white solid, soluble in acetone. Elemental analysis shows a nitrogen level of 13.6%. HPLC: 3.5 min, 6.08 min. Column: Jordi Gel DVB 1000A, mobil phase: DMSO, flow rate: 1 ml/min, detector: refractive index

Complex Formation of Polymeric Cyclodextrin Nitrates (FIG. 2) and an Energetic Material (RDX) 1:1 Weight Ratio 10 g polymeric cyclodextrin nitrate (FIG. 2) and 0.2 g NDPA (stabilizer) are dissolved in 10 ml dry acetone. 10 g RDX is dissolved in 200 ml acetone. Both solutions are combined and added to a jacket steel reaction vessel fitted with stirrers and It vacuum. The stirrers consisted of one flat rotating blade with a second, which quickly moved about the first, providing high shear. The jacket steel reaction vessel is temporized to 57° C. The stirring begins slowly and is increased to 400 rpm for 5 min. The mixture is stirred with a slight vacuum until the solution turned to a thick paste. The vessel is emptied into a evaporating dish and is completely dried in a vacuum oven at 62° C. This procedure is used for the 1:5 and 1:10 weight ratio complexes as well.

Initial sensitivity experiments were carried with polymeric cyclodextrin nitrate-RDX complexes, prepared as shown above. The complexes are pressed to solid pellets. The shock sensitivity of RDX was dramatically reduced after encapsulation with the nitrated cyclodextrin polymer. Table 1 shows the safety properties of RDX and polymeric cyclodextrin nitrate-RDX complexes at different ratios.

TABLE 1

Safety Properties

| Complex RDX (weight ratio) | Impact (cm) Bruceton | Friction (kg) | ESD (Joule) |
|---|---|---|---|
| RDX | 19 | 9.6 | 0.0595 |
| Polymeric cyclodextrin nitrate | 47 | 28.8 | 0.1288 |
| Polymeric cyclodextrin nitrate-RDX 1:1 | 42 | 12.8 | 0.1288 |
| Polymeric cyclodextrin nitrate-RDX 1:5 | 27 | 10.8 | 0.1288 |
| Polymeric cyclodextrin nitrate-RDX 1:10 | 30 | 10.8 | 0.1288 |

While the above Example 5 illustrates formation of polymeric cyclodextrin nitrate complex with RDX, other known explosives can be similarly employed. In addition to cyclo-1,3,5-trimethylene-2,4,6-trinitramine (RDX), other illustrative explosives which can be similarly used include cyclotetramethylene tetranitramine (HMX), 3-nitro-1,2,4-triazol-5-one (NTO) and the like.

Generally weight ratios of polymeric cyclodetrin nitrate to explosive of 1:100 to 100:1 are useful.

The complexes are suitably formed by dissolving the polymeric cyclodextrin nitrate and explosive in suitable solvents such as acetone, admixing the solutions and evaporating to dryness.

What is claimed is:

1. A composition of matter comprising nitrated cyclodextrin polymers with a molecular weight between 2,000–50,000.

2. The composition of matter of claim 1 with a nitration degree corresponding to 10–20% nitrogen.

3. The composition of matter of claim 1 wherein the cyclodextrin is an alpha, beta or gamma cyclodextrin.

4. The composition of matter of claim 1 wherein the cyclodextrin polymer is polymerized to yield a linear tube.

5. The composition of matter of claim 4 wherein the cyclodextrin units are connected by a bi-functional linker wherein the final linker will consist of —O—X—(A)—Y—O—, with X and Y which independently from each other can be —CH—, a chain of —$CH_2$ or phenyl group, and A can be —H, —OH, —$NH_2$, —COOH or —$CH_2$.

6. The composition of matter of claim 1 wherein cyclodextrins are bound to a linear polymer backbone.

7. The composition of matter of claim 6, wherein the polymer has a molecular weight between 1,000 and 100,000.

8. The composition of matter of claim 6, wherein the monomer units of the polymer backbone have a formula —[X—Z($X_n$—Y)m]$_p$ wherein X is $CH_2$—, Z is —CH—, Y can be —$NH_2$ —COOH, —OH and n is 0–1 and m is 1, and P is 20–200.

9. The composition of matter of claim 1 wherein cyclodextrins are bound to the polymer backbone by a secondary amine, urethane, ester or ether bond.

10. A new method to synthesize the composition of matter of claim 4, wherein a water swellable polystyrene based resin is used for complex formation as a first step in the synthetic process.

11. A complex comprising a polymeric cyclodextrin nitrate and an explosive.

12. The complex of claim 11 wherein the explosive is RDX.

13. The complex of claim 11 which comprises a stabilizer.

14. The method of desensitizing an explosive which comprises encapsulating the explosive with a polymeric cyclodetrin complex.

* * * * *